(12) United States Patent
Hoang et al.

(10) Patent No.: US 12,449,423 B2
(45) Date of Patent: Oct. 21, 2025

(54) QUALITATIVE ANALYSIS OF PROTEINS

(71) Applicant: Biotage AB, Uppsala (SE)

(72) Inventors: Lee Hoang, Santa Clara, CA (US);
Chris Suh, San Jose, CA (US);
Douglas T. Gjerde, Saratoga, CA (US)

(73) Assignee: Phynexus, Inc., San Jose, CA (US)

( * ) Notice: Subject to any disclaimer, the term of this patent is extended or adjusted under 35 U.S.C. 154(b) by 1320 days.

(21) Appl. No.: 17/047,462

(22) PCT Filed: Apr. 29, 2019

(86) PCT No.: PCT/EP2019/060883
§ 371 (c)(1),
(2) Date: Oct. 14, 2020

(87) PCT Pub. No.: WO2019/211223
PCT Pub. Date: Nov. 7, 2019

(65) Prior Publication Data
US 2021/0148925 A1 May 20, 2021

(51) Int. Cl.
*C07K 1/16* (2006.01)
*G01N 33/68* (2006.01)
*G01N 35/00* (2006.01)
*G01N 35/04* (2006.01)

(52) U.S. Cl.
CPC ........... *G01N 33/6848* (2013.01); *C07K 1/16* (2013.01); *G01N 35/00* (2013.01); *G01N 2035/0434* (2013.01); *G01N 2035/0436* (2013.01)

(58) Field of Classification Search
None
See application file for complete search history.

(56) References Cited

U.S. PATENT DOCUMENTS

2017/0175099 A1   6/2017   Szigeti et al.

FOREIGN PATENT DOCUMENTS

| JP | 2006-515562 A | 6/2006 |
| WO | 2009/003952 A2 | 1/2009 |

OTHER PUBLICATIONS

Ota, S. et al. "High-throughput protein digestion by trypsin-immobilized monolithic silica with pipette-tip formula." *Journal of Biochemical and Biophysical Methods* 70 (2007): pp. 57-62.
"Immobilized Trypsin: Instructions for Use of Products V9012 and V9013." Promega Technical Manual (2010): pp. 1-10.
International Search Report PCT/ISA/210 for International Application No. PCT/EP2019/060883 Jul. 26, 2019.

*Primary Examiner* — Yunsoo Kim
(74) *Attorney, Agent, or Firm* — Harness, Dickey & Pierce, P.L.C.

(57) ABSTRACT

The present invention relates to a method for qualitative analysis of a sample protein, which method comprises the steps of providing a water swollen gel column bed comprising bound protease and a sample protein in liquid buffer, digesting the sample protein into polypeptides by contact with the gel bed and subjecting the polypeptides to mass spectrometry (MS). The method is advantageously performed using back and forth flow of the sample protein including two or more repeats, and may be performed at a temperature of less than about 37° C., such as a temperature of less than about 30° C.
The invention also includes an automated method as well as a device and a kit for performing mass-based analysis of proteins with higher speed than the prior art while maintaining conditions that are tolerable to the protease.

15 Claims, 2 Drawing Sheets

QUALITATIVE ANALYSIS OF PROTEINS

CROSS-REFERENCE TO RELATED APPLICATIONS

This application is a national phase under 35 U.S.C. § 371 of PCT International Application No. PCT/EP2019/060883 which has an International filing date of Apr. 29, 2019, which claims priority to U.S. Application No. 62/661,881, filed Apr. 30, 2018, the entire contents of each of which are hereby incorporated by reference.

FIELD OF INVENTION

This invention relates to protein characterization and analysis, and in particular to enzymatic cleavage of a sample protein into its composite peptides using a protease. The method of the invention efficiently provides for identification of proteins at conditions which are tolerable to the reagents used. Further, the invention also includes an automated method, a device and a kit based on and utilizing the herein-described enzymatic cleavage.

BACKGROUND

Protein characterization, identification and analysis by mass spectrometry can be accomplished by the enzymatic cleavage of the protein into its composite peptides or polypeptides. The polypeptides can be separated by ion pairing chromatography and directed into a mass spectrometer instrument. Using computer-based software, mass information on the polypeptide fragments is used to "reassemble" the original protein to identify the protein. In some cases, proteins may be analyzed directly by mass spectrometry, but in many cases, the protein is too large and must be broken into components for identification. A protease is often used for this purpose. A protease is an enzyme that performs proteolysis by cleaving peptide bonds of proteins and (poly) peptides.

Trypsin, one of the most common proteases used for cleaving proteins, is a serine protease found in the digestive system of many vertebrates. Trypsin cleaves peptide chains mainly at the carboxyl side of the amino acids, lysine or arginine, except when either is followed by the amino acid, proline. Other protease enzymes that cleave proteins include Glu-C, Lys-N, Lys-C, Asp-N, Arg-C and chymotrypsin.

An important part of an enzyme is called the active site. This is where specific protein molecules interact with the enzyme and the chain cleaving reaction occurs. Enzymes will only work at a specific orientation and buffer conditions for binding and reaction. High temperatures, sometimes up to 60° C., increase the digesting ability of protease enzymes.

Typically protein samples are digested with protease enzymes by combining the protein and enzyme in a vial or chamber, heating and mixing the mixture for several hours or overnight.

High digestion of proteins by enzymatic cleaving in a sample may be desired or necessary, especially in cases where the digestion products such as polypeptides are to be analyzed and quantified. Another way of expressing the extent of protein digestion is to say that high coverage digestion is desired. Coverage refers to the number of polypeptides that are identified in a mass spectrometry analysis of the digested protein. Typically 40-60% of peptides of any particular digested protein are identified in a mass spectrometry analysis although coverage up to 70%, 80% and 90% is desired and can be achieved with higher reaction conditions including reaction temperatures at 40° C. and higher.

It is difficult to bring to digest proteins with trypsin or other protease enzymes at temperatures lower than 40° C. High temperatures are always used for digestion when faster digestion is desired. One reason is trypsin and other enzymes obtained from mammal organs have evolved to operate at 37° C. and this is often considered the optimum temperature to use the protease. From practical terms, workers skilled in the art use simply use 40° C. One factor high temperatures are effective is that a protein will tend to denature at higher temperatures. This may help expose the protein structure or sequence for attachment of the enzyme. Another reason is that enzyme's reaction rates generally increase with temperature. Enzymes often have a minimum operating temperature of 40° C. and certainly most enzyme digestions are performed at high temperature. It should be noted that that enzymes will have a maximum operating temperature. While increasing the sample temperature increases the digestion rate, the protease itself is also a protein and self-denaturation (at too high of temperature) would terminate the activity of the protease.

Complete digestion is defined as every possible site that the enzyme can cut the protein does cut the protein. But this is unlikely in routine operation. Protein sequences exist within the protein that react slower rates, probably due steric hindrance which lowers accessibility of the enzyme to the difficult enzyme. Complete mass spectrometry coverage of the protein is not possible unless all of the sequence sites are digested. Shaking or stirring the protein/enzyme sample is needed. Even with these inducements, digestion is often only partially complete.

Fortunately, complete digestion is not necessary for mass spectrometry to identify a particular protein. In many cases proteins are identified with 40-50% coverage of the polypeptide fragments in a mass spectrometry analysis. This coverage is sufficient for many protein however 50-60% and is routinely desired. In some cases up to 70% and 80% and higher is achieved. For the purpose of this application sufficient digestion is defined as 50% coverage producing sufficient polypeptides for the identification of the protein by mass spectrometry.

Decreasing the protease reaction temperature may be desired but produces very long reaction times. In some cases, digestion at temperatures lower than 37° C. can be achieved by overwhelming the sample with enzyme (i.e. adding much more enzyme than would otherwise be needed or desired). In some cases, more enzyme is repeatedly added to "refresh" the sample and continue digestion that may have stalled. In some cases digesting for very long times can be performed. Partial digestion of proteins under these conditions may be achieved in some cases, but only after long periods of reaction and the product is uncomplete and unpredictable. Even if sufficient digestion coverage may be achieved for some proteins the times are long and the results are also unpredictable. It is unknown if a particular protein will digest enough at low reaction temperature to be identified by mass spectrometry.

It is difficult to predict the conditions necessary to sufficiently complete the protein digestion in a known time period because the amount of protein to digest in the sample may vary to a large degree and unpredictably. The digestion time needed for suitable mass spectrometry coverage can increase as the mass of the protein to be digested is increased.

Sufficient digestion coverage is desired to ensure that all of the protein is digested and to increase the concentration of the resulting polypeptides. Identification of the protein requires that all possible polypeptides are represented in the digested product. Reproducible and predictable digestion is also desired.

There exists a need for increasing the rate of enzymatic digestion. There exists a need for decreasing the time needed to bring enzymatic digestion of a sample to completion. There exists a need to bring the digestion reliably and predictably to acceptable coverage. There exists a need to reduce the amount of protease used per reaction. There exists a need to reduce the temperature at which digestions can be performed quickly and completely and at reasonable and predictable times. For analysis, there exists a need to digest samples in parallel at lower temperatures where all samples are completely digested in a short time (e.g. less than 4 hours, less than 3 hours, less than 2 hours or less than 1 hour) regardless of the particular (sometimes unknown) protein.

In addition, there exists a need to automate the digestion process. However, the digestion may be part of a multi-step sample preparation in which different chemical processes are performed in series to prepare the samples. For example desalting may be required after digestion. The desalted sample may be analyzed by mass spectrometry. This requires predictable times for each step to be complete. The requirement for predictable times for completion of each step is also true for performing procedures in an automated robotic system where the completion of any particular process is temperature or sample dependent and the time of completion is unknown.

SUMMARY OF INVENTION

One aspect of the invention is a method for qualitative analysis of a sample protein, which method comprises the steps of
  a) Providing a water swollen gel column bed comprising at least one bound protease;
  b) Providing at least one sample protein in liquid buffer;
  c) Digesting said sample protein by contact with the gel bed of step a) to provide for cleaving of the protein(s) into polypeptides; and
  d) Subjecting the polypeptides obtained from step c) to mass spectrometry (MS) to obtain mass information related thereto,
wherein step c) comprises back and forth flow at a temperature of less than about 37° C.

Another aspect of the invention is an automated method for the cleavage of a protein into polypeptides and recovery of the polypeptide product, the method comprising:
  a) Providing a robotic liquid handler comprising a plurality of water swollen gel column beds each comprising at least one bound protease selected from the group consisting of trypsin; Glu-C; Lys-N; Lys-C; Asp-N; Arg-C; and chymotrypsin;
  b) Providing at least one optionally denatured protein in liquid buffer;
  c) Contacting the protein with the gel beds of step a), each gel bed configured to hold a solvent in contact with the gel bed and to allow the solvent to flow through the bed during a back and forth cycle of said solvent through said bed;
  d) Digesting the protein with back and forth flow cleaving the protein into polypeptides in less than 4 hours, and optionally diluting the sample;
  e) Adding an ion pairing reagent to the sample;
  f) Providing a reverse pipette tip column, and optional conditioning the column;
  g) Adsorbing polypeptides to the pipette tip column with back and forth flow, and optionally washing contaminants from the column; and
  h) Eluting polypeptides.

A further aspect of the invention is a device for cleaving a protein, said device comprising: a pipette tip comprising a gel bed, said pipette tip configured for cleaving a sample protein with back and forth sample flow, said pipette tip having a BSA-Trypsin Cleavage Performance Factor in the range of 2 to 100.

An additional aspect of the invention is a kit for qualitative analysis of a sample protein, which kit includes a protease-loaded pipette tip column, one or more denaturing reagents, one or more buffers, and instructions for performing a mass-based analysis of fragments of the sample protein.

Additional details, advantages and embodiments of the invention will appear from dependent claims as well as from the detailed disclosure of the invention with its appended experimental section and drawings. In the present application, it is to be understood that any detail or technical feature discussed or described in relation to one aspect will be equally useful in any one of the other aspects.

DETAILED DESCRIPTION OF INVENTION

Figure 1:
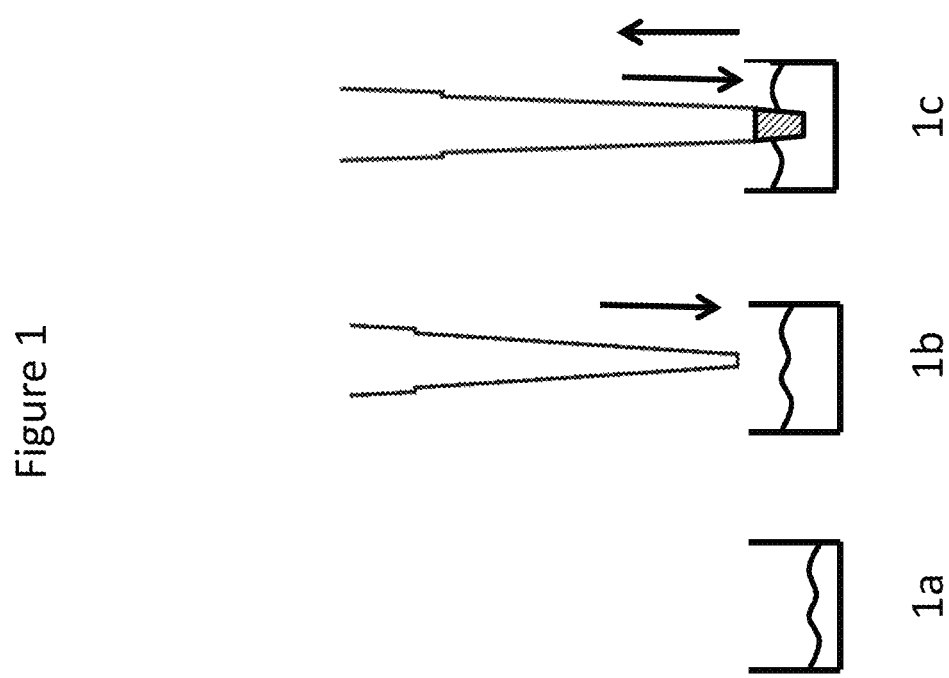
FIG. 1 illustrates how denaturing and digestion of a protein may be accomplished according to the invention.

Thus, the present invention includes a column method and apparatus for rapid, low temperature, enzymatic digestion of sample proteins without incubation of the enzyme with the protein. One advantage of the invention is the repeatedly bringing undigested or partially digested sample in contact with an enzyme immobilized or otherwise bound to a gel column bed comprising a water swollen bead resin, such as agarose, sepharose, cellulose or dextran substrate that is capable of swelling in water, where the enzyme molecules have been provided throughout all or substantially all of the gel column bed. Migration of the sample protein and its cleavage products in the form of polypeptides in and out of the resin bead substrate is rapid and no capture of the protein occurs. The enzymes bound to the substrate are located on the bead surface and interior of the bead. As discussed in further detail below, the enzyme(s) may be Trypsin, Chymotrypsin, Glu-C, Lys-N, Lys-C, Asp-N or Arg-C.

The resin substrates are water swollen and are designed to operate with water based buffers. However, in some embodiments of the invention, denaturing reagents are added to the buffers including acetonitrile and other water miscible organic solvents. In some embodiments of the invention denaturing reagents include urea, guanidine HCl and similar reagents. In some embodiments of the invention denaturing reagents include acids. Flow through the column bed is still possible even with low pressure force pumping such as pipettes or syringe style pumps.

One advantage of the present invention is the use of columns and methods which includes back and forth flow in one or more pipette columns. The resin beads placed in the columns are selected not to be able to capture any sample protein, but rather the sample protein and the reaction products polypeptides diffuse in and out of the column as sample and buffer flow back and forth in the column. Surprisingly, denaturing reagents do not prevent back and forth flow through the column. The water swollen beads maintain interstitial space between the beads to allow the flow through the column bed. The pores of the water swollen substrate allow diffusion of reagents, reactants and products in and out of the bead substrate as the flow flows around the bead substrates.

The digestion process is rapid and with mass spectrometry polypeptide coverage greater than about 50% with columns and methods of the invention and can be performed at temperatures less than about 37° C. or about 30° C. Digestion temperatures are typically less than about 30° C., generally about 20° C. or about 25° C.

The enzymatic protein digestion reactions according to the invention may be performed at room temperature or at ambient temperature. The process may be performed in the presence of denaturing reagents including acetonitrile without damaging or changing the resin substrate and diffusion characteristics and without damaging or changing the resin bed flow characteristics.

The process may be performed in parallel with other processes and may be automated. The process may be run in series with other sample preparation processes to prepare the sample for analysis by liquid chromatography, mass spectrometry and/or other analytical methods. These processes include capture of the protein with an automated back and forth flow column, elution and recovery of the protein. Then the protein is digested in a protease bound substrate in a back and forth flow digestion. The resulting mixture of peptides is desalted with a third column based on gel filtration or ion pairing reverse phase chemistry and the finally the sample is introduced into a mass spectrometer and analyzed. The steps are performed in series and automated prior to introduction into a mass spectrometry.

A robotic liquid handling system as used in the column and method of the invention includes computer control of specific events and their sequences must be performed at predetermined times and parameters. The robotic hardware may consist of a single channel or multichannel pipette head to process columns or transfer liquids. It may contain a gripper to move plates or fixtures to specified deck positions. The deck may contain columns or pipette tips and fixtures. In many cases robotics use a 96 well configuration. The robotic liquid handler may incorporate a SBS plate format for spacing and size SBS is the Society for Biomolecular Sciences who began the initiative to create a standard definition of a robotic plate.

With regard to the protease used, trypsin is a common protease for protein digestion and is known to cleave at the carboxyl side of positively charged lysine (Lys) and arginine (Arg) residues except when they are followed by proline (Pro), aspartic acid (Asp) or glutamic acid (Glu). Other proteases, with different selectivity such as Glu-C, Lys-N, Lys-C, Asp-N, Arg-C or chymotrypsin, may also be used to digest proteins. Digestion with these proteases may improve individual protein sequence coverage or generate unique peptide sequences for mass spectrometry applications. Digestion with multiple proteases may be performed separately, together or sequentially.

However, trypsin and other proteases can be unpredictable. Autolytic digestion can be an issue. Trypsin may be reacted with N-p-Tosyl-L-phenylalanine chloromethyl ketone (TPCK) and/or formaldehyde to decrease autolytic reactions of the trypsin that may produce extraneous polypeptides. However, a solution of enzyme has unknown activity due to the unknown concentration of active enzyme and unknown activity of enzyme that may have been left unrefrigerated and/or exposed to high temperatures. The rate of digestion will change with any particular protein and concentration.

In some cases, the rate of enzymatic reaction of proteins is inhibited or prevented by shape or internal bonding of the protein. Protein folding is driven by its interaction with water. The unfolding of proteins through heat and chemical means is denaturation. These proteins may need denaturation prior to digestion to allow sufficient digestion coverage of the protein. It is unknown whether the denaturation of an unknown protein is necessary. Denaturation may improve the rate of digestion or even be necessary for sufficient digestion coverage. Denaturation exposes the polypeptide chains of the protein so that they are accessible to the enzyme to cleave or digest the protein. However, the presence of denaturing chemicals can affect the digestion rate and make the rate variable and unknown. Denaturants such as acetonitrile, urea, guanidine chloride and others, under denaturing conditions, may inhibit the protease process or change the rate of digestion, making it difficult or impossible to predict the time necessary for sufficient digestion coverage. Denaturants can affect flow through a column. Denaturants can affect diffusion of reactants, reagents and products in and out of a water swollen bead. Denaturants can affect diffusion of reactants, reagents and products in and out of a water swollen bead. Decreasing the pore size will may slow the kinetics of reaction of and resin substrate supported protease with protein reactions. This is because denaturants can affect the extent that a water swollen bead remains completely water swollen. Denaturants can affect the flow of reactants, reagents and products through a bed of water swollen beads. The backpressure of a water swollen bed will increase if the beads shrink due to denaturants.

The cleavage process is a several step process: Reactant and/or enzyme must diffuse, migrate and adsorb to each other. Adsorption of the enzyme to the reactant must be in the correct orientation for cleavage to occur. Digestion products must migrate and move out from the enzyme.

The concentration of protein or amount of protein in a sample may be unknown, making it difficult or impossible to predict the rate of digestion or the time needed for sufficient digestion coverage. Higher concentrations of protein may require more enzyme and/or higher concentration of enzyme. Higher amounts of protein may require more enzyme and/or higher concentration of enzyme.

Clinical diagnostic applications use mass spectrometry and liquid chromatography mass spectrometry. Mass spectrometry allows for identification of the protein from it peptides and liquid chromatography allows for the identification and quantification of the protein. Both tools require predictable and sufficient digestion coverage of the starting protein. Parallel sample preparation and automation requires rapid, predictable digestion preferably at low temperature. In addition, digestion of a protein will often require removal of matrix materials through desalting, putting more barriers and obstacles to parallel operation and automation. Combining sample preparation chemistries such as column digestion and column gel buffer exchange or column digestion and column ion pair reverse phase desalting is difficult but necessary for parallel and automated operation.

Unlike other pipette tip affinity columns where materials from a sample are captured, enzyme pipette tip columns do not capture material. The enzyme is attached to a resin contained in the column. Protein flows through the column and comes in contact with the enzyme. If the contact with the enzyme is suitable for sufficient time, correct orientation and sufficient temperature, etc., then the enzyme will cleave the protein. The protein reactant and the polypeptide products of the cleavage are not retained by functional groups on the resin. Nothing is captured for purification. Unlike other classical enzyme interactions where the enzyme is in solution, the enzyme is bound to a substrate bead and movement within a solid phase is severely inhibited.

The columns of the present invention contain beads of resin which are at least partially water swollen. Water swollen beads can improve enzyme capacity, although reactants have to diffuse or migrate in and out of the beads for enzyme reactions to occur. But protein and polypeptide diffusion are relatively slow through a resin bead compared to transport with no substrate. With the bead matrix present, there may be steric hindrance to achieve the necessary orientation of the reactants. Increasing the temperature is one way to compensate for slow kinetics. Another method is to increase the number of beads relative to the amount of protein so that reactions will occur on the surface of the resin media rather than in the interior. The products of the reactions must diffuse out of the water swollen bead resin matrix.

In one embodiment of the invention, the enzyme trypsin is bound to the solid phase of resin contained in a back and forth flowing column controlled by a pipette or syringe pump or pump employing positive and negative head pressure. In another embodiment of the invention, the pumping is part of a robotic liquid handling system. Samples may be processed 1 at-a-time, 1-8 at-a-time, 1-12 at-a-time, 1-96 at-a-time or 1-384 at-a-time or more.

In some embodiments, the enzyme is contained or bound to a resin matrix that is partially or fully water swollen. These include water swollen agarose, cellulose, dextran and Sepharose.

The column containing the bound solid phase trypsin or protease enzyme may be used to treat a solution containing proteins to cleave the proteins into polypeptide fragments. In the final cycle, the polypeptide fragments are recovered while the trypsin or protease remains bound to the column.

Protein-Protease Performance Factor description: The performance of a digestion device as described herein, such as a pipette or liquid handler equipped with protease bound media, may be characterized by a "Protein-Protease Performance Factor." This factor is defined as:

Protein-Protease Performance Factor=N where N is the least number of back and forth cycles required to achieve at least 50% cleavage coverage of 20 μg of a standard protein under defined conditions. One back and forth flow cycle consists of a single aspiration and expulsion through the column bed. The ratio of sample weight/column bed volume: (μg/μL) is 4 or more and the temperature is in the range of 20-25° C. In some embodiments, the protein is BSA, the protease is trypsin bound to beads, and a BSA-Trypsin Cleavage Performance Factor can be determined. In some embodiments, a BSA-Trypsin Cleavage Performance Factor is between 5 and 200, between 10 and 100, between 20 and 50 or between 10 and 30. In some embodiments, a BSA-Trypsin Cleavage Performance Factor is 30. In some embodiments, a BSA-Trypsin Cleavage Performance Factor is 20. In some embodiments, a BSA-Trypsin Cleavage Performance Factor is 10. In certain embodiments, N is less than 40, less than 30, less than 20, less than 10 or less than 5.

In one experiment that demonstrates this, a 50 μg BSA protein solution mixture is subjected to 20 back and forth cycles with a 5 μL column bed containing trypsin over a period of 20 minutes, 30 minutes or 40 minutes. In a separate experiment, a 50 μg BSA protein solution mixture is subjected to 2 back and forth cycles over 4 minutes. Then, the mixture is left on the column for 10 minutes, 20 minutes, 30 min or 1 hour. In a separate experiment, a 50 μg BSA protein solution mixture is subjected to 5 back and forth cycles over 5 minutes then is left on the column for either 10 minutes, 20 minutes, 30 min or 1 hour. All experiments are performed at room temperature. The mixtures are measured for completion of digestion by gel separation. Only the experiments with 20 back and forth cycles showed sufficient digestion coverage of the protein. The experiments with 5 back and forth cycles shows the next greatest amount of protein digestion, and the experiment with 2 back and forth cycles shows the least amount of protein digested. Leaving the protein solutions in the column does not result in any additional of protein digestion.

Pipette tip column solid phase-bound trypsin provides a rapid method for digesting more than 50% of a protein over a wide range of concentrations including high mass amounts of protein relative the amount of trypsin enzyme (see tables 1 and 2). Digestions may be completed in less than 4 hours, less than 3 hours, less than 2 hours, less than 1 hour, less than 30 minutes, less than 15 minutes less or less than 5 minutes. As the mass amount of protein being digested increases, the residence time that the flowing protein solution is in contact with the column may be increased. Digestion of the protein in the bulk solution only occurs when fluid is flowing through the column. Contact time is the time for which fluid is flowing in a back and forth movement through the column. When the fluid stops flowing through the column, digestion stops. The only digestion still occurring is on protein contained in the interstitial fluid between the beads of the column (to diffuse in and out of the column beds), which is a minor portion of the sample. This minor portion of the sample is the interstitial volume divided by the total sample volume. For methods of the invention, the interstitial volume divided by the total sample volume is less than 30%, less than 20%, less than 10%, less than 8%, less than 6%, less than 4%, less than 3%, less than 2% or less than 1% of the sample. Sufficient digestion coverage of the protein is not accomplished through incubation of the sample with the resin in the columns. Rather, digestion is accomplished when the sample is flowing through the resin bed. No shaking or water baths are used. While the temperature of the reaction may be increased to increase enzymatic activity, normally the process is performed at room temperature. Room temperature is considered as 18-28° C., typically 20-25° C. Columns of the invention may be operated at 40° C. and higher even in the presence of denaturing reagents.

For the purpose of protein identification with mass spectrometry, digestion protein coverage is considered greater than 40%, greater than 50%, greater than 60%, greater than 70%, greater than 80%, greater than 90%, or greater than 95%, of the starting protein is digested into the peptide fragments. The time necessary for sufficient digestion coverage is less than 4 hours, 3 hours, 2 hours or 1 hour. In minutes, the time necessary for sufficient digestion coverage is less than 90 minutes, 80 minutes, 60 minutes, 50 minutes, 40 minutes, 30 minutes, 20 minutes, 15 minutes, 10 minutes, five minutes, 4 minutes, 3 minutes, 2 minutes or 1 minute. In terms of ranges, the time necessary for sufficient digestion coverage can be in the range of 0.25 hours-4 hours, 0.5 hours-3 hours, 0.5 hours-2 hours or 0.5-1 hour.

The extent of digestion may be determined by comparing the amount of undigested protein remaining after the column process with the original (starting) amount of protein. However, larger peptide fragments of digested proteins may also contain undigested sequences. Therefore, as the amount of undigested original protein digested or cleaved decreases, at least some the peptide sequences are represented in the final product. But this assumes that some digestion sequences will digest at the same temperature as initial sequences that are digested. This is not true for sequences that may need denaturation before digestion or enzymatic cleavage can occur.

By using a reduced temperature, it is possible to reproducibly control the extent of partial digestion. In these cases, the extent of digestion is controlled by the residence time that the protein is in contact with the column. Using partial digestion with a universal protease like proteinase K, we can control cleavage by controlling the flow rate, sample size and the number of cycles. Residence time is calculated by sample volume divided by flow rate, multiplied by the number of half cycles. Analysis of the product can give information on the structure of the protein or protein complex.

The technology can be used to digest the protein on a protein-nucleic acid complexes and to study chromatin structure.

Steps of the Process
1. Attached enzyme to solid phase
2. Pack the solid phase enzyme from step 1 into a pipette tip or back and forth flow column
3. Provide a sample of protein dissolved in a buffer or liquid
4. Optionally denature the protein sample
5. Flow the protein repeatedly through the column using back and forth flow without incubation of protein with the solid phase enzyme.
6. Expel the digested sample into a vial or well
7. Perform analysis or downstream processing Results and Advantages of the Invention The sufficient digestion coverage of protein into polypeptides is accomplished at room temperature, without incubation of the sample with the solid phase enzyme resin.

The enzyme and protein efficiently move in back and forth flow into the correct orientation and proximity for the enzymatic cleavage to occur at room temperature, so that the protein can be digested completely.

The state of correct orientation and proximity of the enzyme and protein is maintained long enough in back and forth flow at room temperature will to complete the enzymatic cleavage and sufficiently digest the protein to achieve at least 50% coverage.

The bound enzyme molecule can maintain activity at room temperature in a flowing stream with repeated reversed flow exposure and repeated exposure to fresh sample.

The digestion to produce sufficient digestion coverage, can occur in back and forth flow in the water swollen beads under denaturing conditions, even with high concentrations of acetonitrile, urea, guanidine or other denaturing reagents.

The acetonitrile denaturing conditions may be maintained for denaturing the protein with enzymatic cleavage of a protein and then the reagents can be diluted. This is done to the extent necessary for an ion pairing reagent to be added and the mixture and applied to a reverse phase pipette tip column to retain polypeptide fragments and desalt the sample. If the acetonitrile concentration is too high, the fragments will not adsorb to the column medium under the ion pairing reversed phase column conditions.

The ratio of bound enzyme to protein ratio is low compared to static digestion, yet the digestion process proceeds to sufficient peptide coverage.

The quality or activity of the trypsin enzyme contained in the solid phase in the back and forth flow column does not need to be high to achieve to sufficient digestion coverage. The back and forth flow number of cycles may be increased for enzymes that have low activity.

The backpressure of the partially water swollen resin does not change or limit the flow through the column bed with the introduction of denaturing reagents either at low temperatures or high temperatures.

The pipette pumping mechanism operates with the introduction of denaturing reagents into the column.

The column backpressure is lower than 3 psi at 1 mL/min with the introduction of denaturing reagents into the column containing water swollen resin.

Reference is made to the Figures, providing an illustration of the herein discussed embodiments.

Column bed volumes may be adjusted to increase enzymatic activity. Surprisingly, only very small amounts of enzyme bound to a resin and contained in small column bed volumes are needed for sufficient digestion coverage of the protein sample. Pipette tip column bed volumes may be less than 100 µL, 90 µL, 80 µL, 70 µL, 60 µL, 50 µL, 40 µL, 30 µL, 20 µL, 15 µL, 10 µL, 5 µL, 4 µL, 3 µL, 2 µL, 1 µL, 0.5 µL or less than 0.1 µL.

The mass amount of protein that may be digested by the column is in the range of 0.1 µg-5 mg, 1 µg-2 mg, 2 µg-1 mg, 5 µg-500 µg, 10 µg-500 µg or 20 µg-200 µg. Often the range is 10-500 µg of protein.

Proteins may be denatured, reduced, or alkylated and then digested by the pipette tip back and forth flow column.

The ratio of µg protein digested completely in the back and forth flow process to the µL of column bed volume is greater than 2, 5, 10, 15, 20, 25, 30, 40, 50, 60, 70, 80, 90, 100 or greater than 200.

Another aspect is the stability of the method, as optionally directed to automation or other methods where the sample and reagents are in an instrument or on a bench for an unknown and variable length of time. The results are identical whether the sample and reagents and columns are left unused in the instrument or on the bench for 8 hours, 7, 6, 5 4, 3, 2, 1, 0.8, 0.7 0.6, 0.5, 0.4, 0.3, 0.2 or 0.1 hour.

TABLE 1

| Column bed volumes that have successfully digested varying amounts of protein | |
|---|---|
| Amount of Protein to Be Digested | Volume of column bed |
| 0-20 µg | ≤10 µL |
| 20-49 µg | ≤50 µL |
| 50-149 µg | ≤100 µL |
| 150-299 µg | ≤200 µL |
| 300-500 µg | ≤300 µL |
| 0-20 µg | ≤5 µL |
| 20-49 µg | ≤20 µL |
| 50-149 µg | ≤20 µL |
| 150-299 µg | ≤50 µL |
| 300-500 µg | ≤50 µL |

TABLE 2

Column bed volumes that have successfully digested varying amounts of protein

| Amount of Protein to Be Digested | Volume of column bed |
|---|---|
| 0-149 µg | ≤10 µL |
| 0-149 µg | ≤50 µL |
| 0-149 µg | ≤100 µL |
| 0-299 µg | ≤100 µL |
| 0-500 µg | ≤100 µL |

Protein preparation may include denaturation, reduction and alkylation. Proteins may be denatured, reduced or alkylated using standard laboratory protocols. Protocols for denaturing need to be optimized for individual sample sources or proteins. Proteins may be denatured and then samples diluted for more efficient enzyme digestion.

In some embodiments, proteins require efficient solubilization, denaturation and disulfide bond reduction for sufficient digestion coverage or more complete polypeptide sequence coverage. The following optional steps can be used facilitate protease digestion.

Disulfide reduction: Add dithiothreitol (DTT) to the protein solution for a final concentration of 5 mM or TCEP (Tris(2-carboxyethyl)phosphine) for a final concentration of 5 mM and heat at 50-60° C. for 10-20 minutes.

Alkylation: Add iodoacetamide to the reduced protein solution at room temperature for a final concentration of 15 mM and incubate in darkness for 15 minutes at room temperature.

Solubilize/Denature: Dissolve the protein in up to 50 mM ammonium bicarbonate, pH 7.5. Proteins that are difficult to dissolve or require denaturation for efficient digestion can be solubilized in a denaturant such as 6-8 M urea or 6 M guanidine HCl at room temperature or heated up to 37° C. for up to 1 hour prior to digestion. In some cases, it may be necessary to further heat the sample to 60° C. or even up to 95° C. for a short time.

In some embodiments, acetonitrile (ACN) is used to denature the protein prior to enzymatic digestion. A concentration of up to 65, 60, 50, 40, 30 or 20% acetonitrile or other denaturing solvent may be used. In some embodiments 40% acetonitrile is used to denature or maintain the protein in a denatured state.

After digestion, an ion pairing reverse phase column may be used to desalt the peptides. In some embodiments, the digested protein containing peptides and ACN can be used to condition or wet a reverse phase column. The mixture is introduced into the column with back and forth flows. After conditioning, the sample is diluted to reduce the concentration of ACN, often to below 10%. An ion pairing reagent such as trifluoroacetic acid (TFA) is added to the mixture with the dilution. TFA is commonly employed, but pentafluoropropionic acid (PFPA) and heptafluorobutyric acid (HFBA) and similar materials have also been used. The reverse column is used to capture the polypeptides and remove any other materials. Then, the organic solvent (often ACN), concentration is increased to remove the ion pair containing the polypeptide from the column, eluting the polypeptides and making them ready for analysis.

A digestion column with back and forth flow may be used at room temperature. Room temperature is defined as 20-25° C. In some embodiments of the invention digestion is performed in the temperature range of 25-30° C. or 30-35° C. or 35-40° C. It may difficult to increase and maintain the digestion temperature of a back and forth flow column, especially in a robotic system.

Desalting columns as described in this invention may be of two types. One type is a unidirectional flow-through gel filtration column. The other is a pipette tip, back and forth flow column based on reverse phase resin contained in the pipette tip. Reverse phase columns require that ion pairing reagents are added to the sample prior to capture by the column. Common ion pairing reagents include trifluoroacetic acid (TFA), pentafluoropropionic acid (PFPA) and heptafluorobutyric acid (HFBA). Capture takes place under aqueous buffer conditions with a low organic solvent concentration. The polypeptide forms a nonpolar ion pair with the ion pairing reagent and the combination is captured by the reverse phase pipette tip column. In the automated devices and methods of the invention, the bed size of the column ranges from 1 µL to 100 µL or 5 µL to 20 µL with pipette tip volumes ranging from 50 to 2000 µL or 200 to 1200 µL.

Kits may be assembled and applied to device and methods of the invention. In one example, a kit includes a trypsin-pipette tip column(s), denaturing reagents, buffers and instructions. In another example, a kit includes a trypsin-pipette tip column(s), denaturing reagents, reverse phase desalting pipette tip column(s), ion pairing reagents, buffers and instructions.

DETAILED DESCRIPTION OF THE DRAWINGS

FIG. 1 is an illustration of how denaturation and digestion of a protein is accomplished according to the invention, using a pipette tip back and forth flow column. More specifically, FIG. 1 shows in Step 1a how a protein sample is provided; in Step 1b how a denaturing reagent is optionally added, and in Step 1c how back and forth flow is applied to the enzyme column at room temperature to convert sample to polypeptides/peptides.

Figure 2:
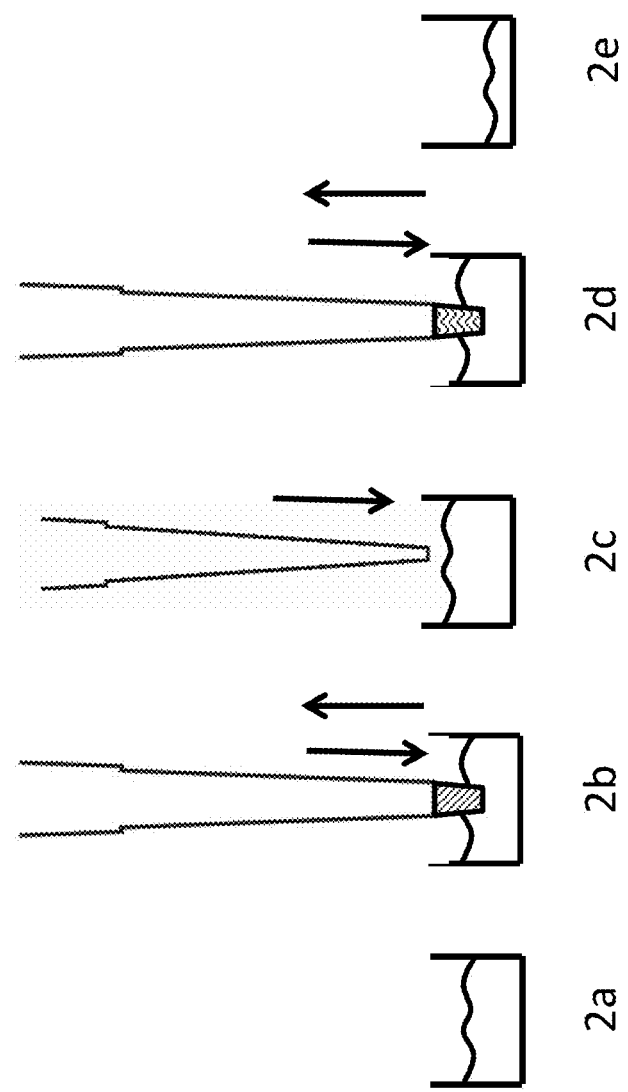
FIG. 2 illustrates a specific workflow for protein digestion and peptide desalting according to the invention.

FIG. 2 is an illustration of a specific workflow according to the invention including protein digestion and peptide desalting. More specifically, FIG. 2 shows in Step 2a how a protein sample is provided, and optionally denatured, in Step 2b how back and forth flow is applied to the column to convert sample protein to polypeptides, at temperature such as room temperature, in Step 2c how the sample is optionally diluted, and an ion pairing reagent is added, in Step 2d how back and forth flow may be applied to a reverse phase desalting column to purify peptides, and wash impurities, and Step 2e how processed sample including polypeptides is eluted. Concentrated desalted samples are thereby ready for analysis. This workflow may be applied in 96 well format or plate format and introduced under robotic conditions to an LC-MS or MS.

EXPERIMENTAL PART

All examples provided in the present application are provided for illustrative purposes only, and should not be construed as limiting the invention as defined by the appended claims. All references provided below or elsewhere in the present application are hereby included herein via reference.

EXAMPLES

Examples of workflow for different applications. Pipette tip columns with back and forth flow are used for each step of the workflow. The steps described in the examples may be automated.

1. Protein analytics—biologics characterization
2. Diagnostic
3. Peptide mapping
4. Mass variant analysis for marker discovery
5. Disease marker discovery Example 1. Example Workflow for Protein Analytics—Biologics Characterization 1. Purify protein by affinity chromatography
2. Buffer exchange by gel filtration
3. Optionally denature, reduce, alkylate and then dilute
4. Protease digest by solid phase enzyme and then dilute
5. Desalt with ion pairing reverse phase
6. Chromatographic mass spectrometry analysis Protein drugs and protein drug candidates are different from conventional small molecule drugs in that they are not chemically synthesized. Instead protein drugs, called biologics, are recombinant proteins synthesized using the cellular machinery of live mammalian cells.

Consequently, the major challenge of manufacturing biologics is the maintenance of post translational modifications, protein molecular weight, charge homogeneity and other physical attributes. Together, these analytical measurements require high performance, small volume processing especially for mass spectrometry profiling. For high throughput applications, the fundamental step of trypsin digestion must be rapid, robust and free of auto-digestion.

The biologic is made as a recombinant protein from a cell culture. The protein is purified using an affinity process. Many samples can be processed simultaneously using 96 at-a-time robotics and pipette tip columns packed with affinity resin. Using back and forth flow for high performance purification, the set of 96 samples is delivered in plate for buffer exchange. The plate of protein is buffer exchanged, 96-at-a-time, using pipette tip columns packed with gel filtration media. The buffer exchanged samples are now in an optimal buffer for trypsin digestion. This step may include denaturants to promote protein unfolding for trypsin accessibility. 96-channel robotics are used to simultaneously digest the samples using pipette tip columns packed with trypsin-immobilized beads. The liquid handling system continuously pumps the protein back and forth through the trypsin resin bed at room temperature. After 30 minutes of cycling with 10-50 back and forth flow cycles, the protein is digested into peptides. The peptides are further prepared using 96-channel robotics and pipette tip columns packed with C18 reverse phase media. The desalted sample is now ready for mass spectrometry analysis by removing any buffer component that would inhibit ion suppression.

Example 2. Example Workflow for Protein Complex Disease Marker Discovery and Diagnostics 1. Add His-tag recombinant protein to sample
2. Exchange native protein with tagged, recombinant protein
3. Purify protein by affinity chromatography
4. Buffer exchange by gel filtration
5. Optionally denature, reduce, alkylate and then dilute
6. Protease digest by solid phase enzyme and then dilute
7. Desalt with ion pairing reverse phase
8. Chromatographic mass spec analysis Proteins seldom act as individual proteins in the context of a functional cell. Instead proteins are associated with a number of different proteins and form protein complexes. Sometimes these complexes are transient interactions and can be very difficult to detect. Protein complexes are a viable source of disease information and components of protein complexes are potential disease markers. Recent progress in the field of disease market discovery has highlighted that ratios of specific proteins within a complex correlate to disease. A challenge for disease marker discovery would be a workflow capable of purifying protein complexes in high throughput using small volumes and automation coupled with high performance sample preparation for mass spectrometry analysis.

Protein complexes are purified from complex biological samples through affinity purification using one of several strategies. An antibody raised against a specific protein component can be used to pull out the whole complex. Another strategy is to take advantage of the dynamic nature of the protein constituents of a protein complex. Incubation of a recombinant, tagged version of a protein can, in some cases, result in exchange of the native protein for the recombinant protein. Subsequently, the protein complex can be purified using the tag.

Many samples can be processed simultaneously using 96 at-a-time robotics and pipette tip columns packed with an antibody against a protein component of the complex or by using the tag on the recombinant protein that had replaced the native protein. Using back and forth flow for high performance purification, the set of 96 samples is delivered in a plate to simultaneously digest the samples using pipette tip columns packed with trypsin-immobilized beads. The liquid handling system continuously pumps the protein back and forth through the Trypsin resin bed at room temperature. After 20 minutes of cycling, the protein is completely digested into peptides. The peptides are further prepared using 96-channel robotics and pipette tip columns packed with C18 reverse phase media. The desalted sample is now ready for mass spectrometry analysis by removing any buffer component that would inhibit ion suppression.

Example 3. Example Workflow Peptide Mapping

1. Provide sample
2. Buffer exchange by gel filtration
3. Denature, reduce, alkylate
4. Dilute with buffer
5. Protease digest by solid phase trypsin, Glu-C, Lys-N, Lys-C, Asp-N, Arg-C and/or chymotrypsin digest enzyme
6. Dilute
7. Add ion pairing reagent and desalt with ion pairing reverse phase
8. Chromatographic mass spec analysis Protein drug candidates are discovered through screening libraries against a drug-able target. Once positive interactions are found, the drug candidates are optimized for their binding effects. This process first requires identifying the specific peptide on the target to which the drug candidate binds, a process called epitope mapping. The major challenges of epitope mapping are to generate methods that are robust, reproducible and complete.

The drug targets are recombinant proteins synthesized using the cellular machinery of live mammalian cells. The protein is purified through an affinity process using 96 at-a-time robotics and pipette tip columns packed with affinity resin. Many samples can be processed simultaneously using 96 at-a-time robotics and pipette tip columns packed with affinity resin. Using back and forth flow for high performance purification, the set of 96 samples is delivered in a plate for buffer exchange. The plate of protein is buffer exchanged, 96-at-a-time, using pipette tip columns packed with gel filtration media. The buffer exchanged samples are now in an optimal buffer for trypsin digest. This may include denaturants to promote protein unfolding for protease accessibility. The sample is split into three aliquots and each aliquot is digested using 96-channel robotics. These are used to digest the samples using pipette tip columns packed with either trypsin, chymotrypsin or Glu-C-immobilized beads. The liquid handling system continuously pumps the protein back and forth through the protease resin bed at room temperature. After 20 minutes of cycling, the protein is completely digested into peptides. The peptides are further prepared using 96-channel robotics and pipette tip columns packed with C18 reverse phase media. The desalted sample is now ready for mass spectrometry analysis by removing any buffer component that would inhibit ion suppression.

Example 4. Example Workflow for Mass Variant Analysis for Marker Discovery

1. Provide pipette tip columns containing streptavidin or activated resin for covalent derivatization
2. Generate affinity column
3. Provide sample
4. Buffer exchange by gel filtration
5. Optionally denature, reduce, alkylate and then dilute
6. Protease digest by solid phase chymotrypsin, Glu-C, Lys-N, Lys-C, Asp-N, Arg-C, chymotrypsin Glu-C and/or trypsin.
7. Digest enzyme and then optionally dilute
8. Desalt with ion pairing reverse phase
9. Chromatographic mass spec analysis Recent work has shown that the peptide sequence of some proteins exists with a mass variant that correlates to disease. This potential disease marker is of importance, but very difficult to quantify. Namely, the disease marker would exist in very low abundance. The solution was to enrich the mass variant as part of the workflow that includes purifying the variant in high throughput using small volumes and automation coupled with high performance sample preparation for mass spectrometry analysis.

Affinity purification provides an effective solution for the enrichment of a protein mass variant. An antibody raised against a specific protein component can be used to pull out different forms of that protein. This antibody can be coupled to the column resin with the option of cross-linking. Another strategy for generating affinity resin is to label the antibody with biotin and immobilize the antibody to streptavidin beads. A third alternative is to covalently attach the antibody to an activated resin. Regardless of the strategy, these beads can be used in the form of pipette tip columns packed with the resins described.

Using back and forth flow for high performance purification, the set of 96 samples is delivered in a plate to simultaneously digest the samples using pipette tip columns packed with trypsin-immobilized beads. The liquid handling system continuously pumps the protein back and forth through the trypsin resin bed at room temperature. After 20 minutes of cycling, the protein is completely digested into peptides. The peptides are further prepared using 96-channel robotics and pipette tip columns packed with C18 reverse phase media. The desalted sample is now ready for mass spectrometry analysis by removing any buffer component that would inhibit ion suppression.

Example 5. Example Workflow for Combined Target and Disease Marker Discovery 1. Generate disease cell line
2. Inoculate mouse
3. Antibody purification will with Protein A or Protein G pipette tip column
4. Pull down of membrane preps
5. Buffer exchange by gel filtration
6. Optionally denature, reduce, alkylate and then dilute
7. Protease digest by solid phase Glu-C, Lys-N, Lys-C, Asp-N, Arg-C, chymotrypsin and/or trypsin. Digest enzyme and then optionally dilute
8. Desalt with ion pairing reverse phase
9. Chromatographic mass spectrometry analysis A cancer cell line model has the potential to be an excellent tool for both disease target discovery and therapeutic lead discovery. Once a disease cell line is generated, it can be used to illicit an immune response in a host mouse. The antibodies from the mouse serve as a library of potential leads and can also confer specificity to cell surface proteins of the disease cell line. In this way target discovery and lead discovery can be combined resulting in much shorter timelines.

The disease cells are used to inoculate a mouse and generate an immune response. The antibodies are purified from the animal using 96 at-a-time robotics and pipette tip columns packed with Protein A resin. The disease cells line is processed by lysing some of the cells and preparing a membrane fraction. The purified antibodies are then immobilized to pipette tip columns and used for affinity purification of the membrane fractions. The resulting antibody-membrane fraction complex is buffer exchanged into an optimal buffer for trypsin digest. This may include denaturants to promote protein unfolding for protease accessibility. The sample is digested using 96-channel robotics using pipette tip columns packed with trypsin. The liquid handling system continuously pumps the protein back and forth through the protease resin bed at room temperature. After 20 minutes of cycling, the protein is completely digested into peptides. The peptides are further prepared using 96-channel robotics and pipette tip columns packed with C18 reverse phase media. The desalted sample is now ready for mass spectrometry analysis by removing any buffer component that would inhibit ion suppression.

Example 6. Example Workflow for Bovine Serum Albumin Fragment Analysis

1. Denature BSA
2. Digest BSA with trypsin to generate peptides
3. Desalt peptides using ion pairing C18 reverse phase
4. MALDI-TOF analysis Bovine serum albumin (BSA) is a 607-residue protein and 69 kDa molecular weight. Lyophilized protein standard is purchased from Sigma-Aldrich (P/N A4612) and is made into a 1 mg/mL solution using PBS buffer. Denature 50 µg in a 6 M solution of urea and incubate at room temperature for 1 hour. Add iodoacetamide to a final concentration of 15 mM to alkylate the BSA and incubate in the dark for 15 minutes. The BSA is buffer exchanged using a pipette tip column packed with gel filtration media. Transfer the BSA to a 2 mL deep well plate and adjust volume of the sample to 120 µL with ammonium bicarbonate pH 7.5. Add 80 µL of 100% acetonitrile to the BSA to make a final 40% acetonitrile solution. Use a 200 µL pipette tip column packed with 5 µL trypsin-immobilized beads. Pump the sample back and forth through the resin bed using a flow rate of 250 µL/minute for 20 minutes at room temperature. Blow out the sample into the well and discard the pipette tip columns. Add 600 µL 1% TFA in water to the BSA peptides to dilute the acetonitrile to a final concentration of 10%. Use a 1 mL pipette tip column packed with 10 µL of C18 reverse phase resin to desalt the peptides. Wet the column with 250 µL of 80% acetonitrile followed by conditioning with two aliquots of 1% TFA in water. Load the peptides with 4 cycles using a flow rate of 250 µL/minute. Wash the columns using 1 cycle in 1 mL of 1% TFA at 500 µL/min flow rate. Elute using 4 cycles in 30 µL of 40% TFA at 500 µL/min flow rate. The desalted sample is now ready for MALDI-TOF analysis to show sufficient digestion coverage and presence of all peptides including hydrophobic peptides.

Example 7. Determination of a BSA-Trypsin Cleavage Performance Factor for a 200

µl Pipette Tip Column
BSA: Sigma-Aldrich (P/N A4612)
The BSA is prepared using the method of Example 6.
Amount of BSA: 50 µg
Column gel bed volume: 5 µL trypsin-immobilized beads
Media flow rate during back and forth cycle: 250 µL/minute
Temperature: 23° C.
The BSA is applied to a pipette tip column containing immobilized trypsin. The product is analyzed as described in Example 6 after various numbers of back and forth cycles. The BSA-Trypsin Cleavage Performance Factor is determined as the least number of cycles required to achieve at least 50% cleavage and is observed to be 20.

The invention claimed is:

1. A method for qualitative analysis of a sample protein, which method comprises the steps of
  a) Providing a water swollen gel column bed comprising at least one bound protease;
  b) Providing at least one sample protein in liquid buffer;
  c) Digesting said sample protein by contact with the gel bed of step a) to provide for cleaving of the protein(s) into polypeptides; and
  d) Subjecting the polypeptides obtained from step c) to mass spectrometry (MS) to obtain mass information related thereto,
  wherein step c) comprises back and forth flow at a temperature of less than about 37° C.,
  wherein the water swollen gel column bed is selected from cellulose, agarose, or dextran, and
  wherein said at least one bound protease is selected from the group consisting of trypsin; Glu-C; Lys-N; Lys-C; Asp-N; Arg-C; and chymotrypsin.

2. A method according to claim 1, wherein in at least step c), the temperature is less than about 30° C.

3. A method according to claim 1, wherein in step c), the sample protein is passed back and forth at least twice across the gel bed.

4. A method according to claim 1, wherein in step d), the mass information is used by computer-based software to determine the identity of said sample protein of step b).

5. A method according to claim 1, wherein the column provided has a bed volume in the range of about 5 µL-about 20 µL bed and is capable of processing up to about 150 µg of sample protein.

6. A method according to claim 1, wherein in step b), the protein is provided in a denaturing buffer at room temperature, and wherein said buffer is a denaturizing reagent selected from the group consisting of acetonitrile; urea and guanidine hydrochloride.

7. A automated method for cleaving of a protein into polypeptides and recovering a product including the polypeptide, the method comprising:
  a) Providing a robotic liquid handler comprising a plurality of water swollen gel column beds each comprising at least one bound protease selected from the group consisting of trypsin; Glu-C; Lys-N; Lys-C; Asp-N; Arg-C; and chymotrypsin;
  b) Providing a sample including at least one optionally denatured protein in liquid buffer;
  c) Contacting the protein with the gel beds of step a), each gel bed configured to hold a solvent in contact with the gel bed and to allow the solvent to flow through the bed during a back and forth cycle of said solvent through said bed;
  d) Digesting the protein with back and forth flow cleaving the protein into polypeptides in less than 4 hours, and optionally diluting the sample;
  e) Adding an ion pairing reagent to the sample;
  f) Providing a reverse pipette tip column, and optional conditioning the column;
  g) Adsorbing polypeptides to the pipette tip column with back and forth flow, and optionally washing contaminants from the column; and
  h) Eluting polypeptides.

8. A method according to claim 7, wherein the eluted polypeptides are subjected to mass spectrometry, where the polypeptide coverage is greater than 50%, to provide a qualitative analysis of the protein.

9. A method according to claim 7, where the gel bed volumes are in the range of about 5 µL-about 20 µL bed and are capable of processing up to about 150 µg of sample protein.

10. A method according to claim 7, wherein the pipette tip column provided contains 20 µL or less of solid phase trypsin.

11. A method according to claim 7, wherein step d), where protein digestion is performed at a temperature less than about 37° C., such as less than about 30° C.

12. A kit for qualitative analysis of a sample protein, which kit includes a protease-loaded pipette tip column, one or more denaturing reagents, one or more buffers, and instructions for performing a mass-based analysis of fragments of the sample protein.

13. A kit according to claim 12, wherein said protease is provided bound to a swollen gel bed and is selected from the group consisting of trypsin; Glu-C; Lys-N; Lys-C; Asp-N; Arg-C; and chymotrypsin.

14. A kit according to claim 12, which includes a trypsin-loaded pipette tip, denaturing reagents, a reverse phase desalting pipette tip column, and ion pairing reagents.

15. A kit according to claim 14, wherein the instructions relate to an automated method for cleaving of a protein into polypeptides and recovering a product including the polypeptides, the method comprising:
  a) Providing a robotic liquid handler comprising a plurality of water swollen gel column beds each comprising at least one bound protease selected from the group consisting of trypsin; Glu-C; Lys-N; Lys-C; Asp-N; Arg-C; and chymotrypsin;
  b) Providing a sample including at least one optionally denatured protein in liquid buffer;
  c) Contacting the protein with the gel beds of step a), each gel bed configured to hold a solvent in contact with the gel bed and to allow the solvent to flow through the bed during a back and forth cycle of said solvent through said bed;
d) Digesting the protein with back and forth flow cleaving the protein into polypeptides in less than 4 hours, and optionally diluting the sample;
e) Adding an ion pairing reagent to the sample;
f) Providing a reverse pipette tip column, and optional conditioning the column;
g) Adsorbing polypeptides to the pipette tip column with back and forth flow, and optionally washing contaminants from the column; and
h) Eluting polypeptides.

* * * * *